April 23, 1968
W. K. BRADSHAW
3,379,464
UNIVERSAL BOOM HEEL SUPPORT
Filed Sept. 22, 1966
2 Sheets-Sheet 1
Fig. 1.
Fig. 2.
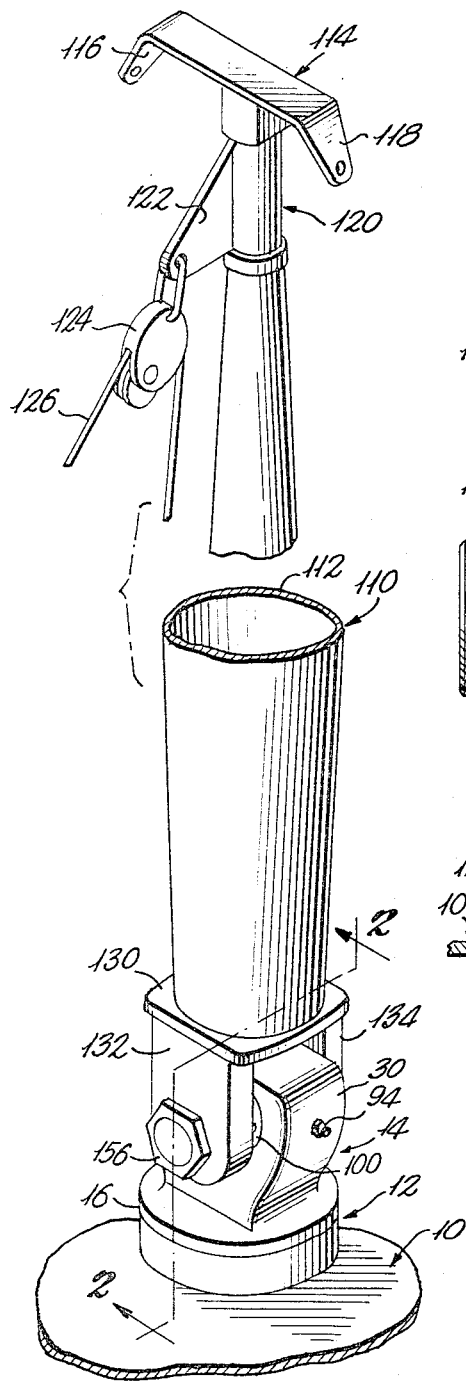
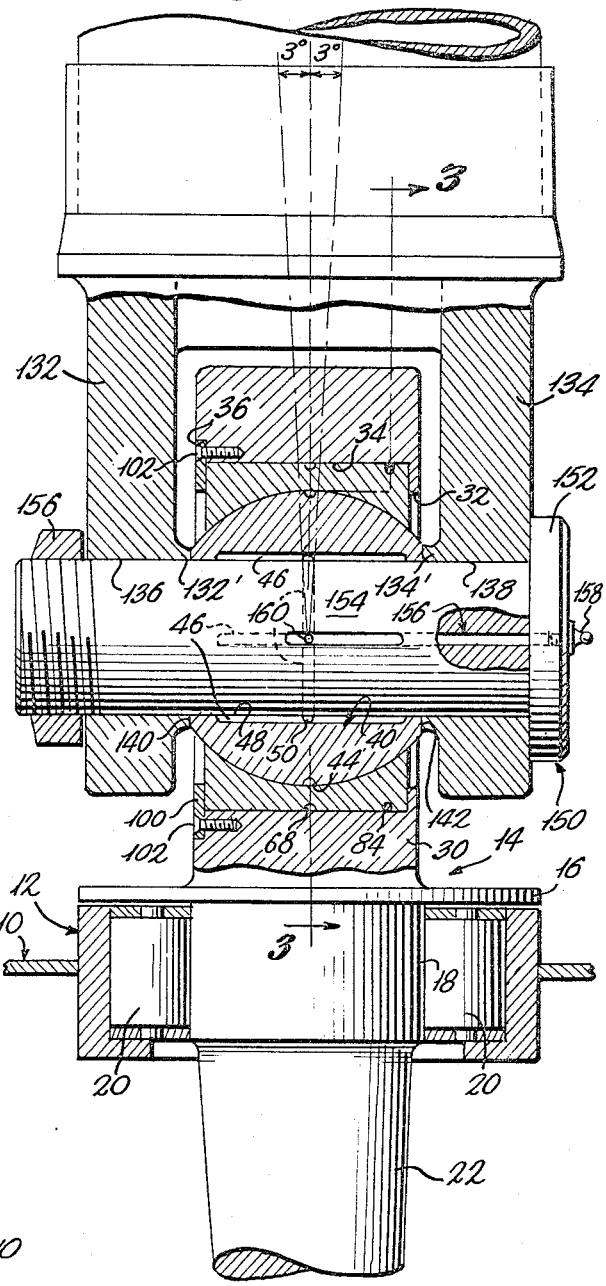
INVENTOR
William K. Bradshaw
BY Shoemaker and Mattare
ATTORNEYS

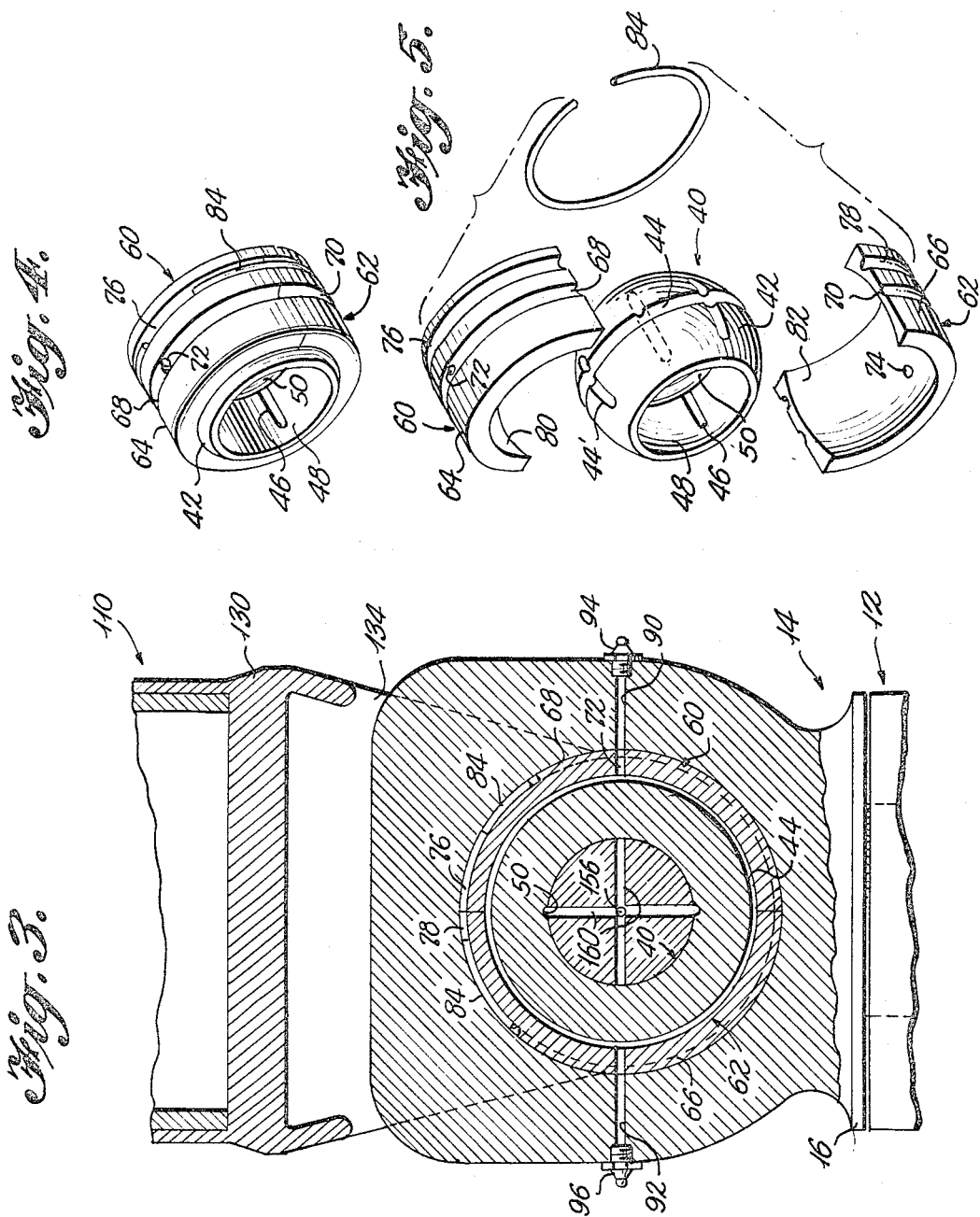

United States Patent Office 3,379,464
Patented Apr. 23, 1968

3,379,464
UNIVERSAL BOOM HEEL SUPPORT
William K. Bradshaw, Hampton, Va., assignor to Newport News Shipbuilding and Dry Dock Company, Newport News, Va., a corporation of Virginia
Filed Sept. 22, 1966, Ser. No. 581,228
1 Claim. (Cl. 287—88)

ABSTRACT OF THE DISCLOSURE

A boom heel support allows a boom to swing freely in one plane of movement and at the same time permits a limited amount of swinging movement in a perpendicular plane. A bearing means includes cooperating spherical surfaces to permit the desired swinging movement of the boom.

---

The present inventon relates to a new and novel universal boom heel support, and more particularly to a support of the type which allows the boom to swing freely in one plane of movement with respect to the axis of the heel pin of the assembly, while at the same time permitting a limited amount of swinging movement in a plane substantially normal to the said plane.

The present invention represents an improvement over U.S. Patent No. 3,176,805. As described in such patent, the boom heel support is adapted to support a boom employed in shipboard cargo loading and unloading operations wherein substantially universal movement of the boom is desired, and further wherein the boom may swing between the uprights when passing from one hatch to another, and wherein it is desired to provide certain desired movement of the boom between such uprights.

The boom heel support of the present invention includes a bearing means having an outer surface defining a portion of a spherical surface similar to the arrangement as shown in the aforementioned U.S. patent. However, the means for supporting this bearing means in the present invention is of a completely different construction so as to afford certain important advantages.

As shown in the aforementioned U.S. patent, the means for retaining the bearing means in position comprises bearing retaining means in the form of a separate member which is bolted into operative position. Accordingly, the means for holding the ball-shaped bearing means in position in this prior art arrangement comprises two pieces which are bolted to one another. In actual use, this type of arrangement could be subjected to fatigue and breakage when the large loads of a heavy lift boom are applied thereto.

SUMMARY OF THE INVENTION

The present invention specifically eliminates the two-piece arrangement of the prior art for holding the bearing means in position, and in the present arrangement, the boom support means is of a one-piece construction in surrounding relation to the race means which in turn supports the ball-shaped bearing means. This provides a much stronger arrangement which is considerably less likely to fail during operation. In addition, the structure of the present invention may be much more readily assembled than the construction as shown in the aforementioned patent. In the present invention, the boom support means is provided with a cylindrically bored recess which receives the bearing means and race means assembly which can simply be moved into operative position wherein the race means has a press fit within the recess in the boom support means. An annular race retaining member is then screwed into position to provide the completely mounted assembly.

As in the prior art, the jaws of the boom heel are pivotally mounted upon a heel pin which is journalled within a bore extending through the bearing means. The boom is accordingly free to swing about the heel pin in a plane extending substantially normally in the heel pin and further has a limited degree of swinging movement in a plane which is substantially normal to the aforementioned plane.

This last-mentioned limited swinging movement has been found to be very desirable since the load is often applied to the boom in such a maner that the boom tends to move in a plane slightly inclined with respect to a plane drawn through the center line of the boom in its vertical position.

An object of the present invention is to provide a new and novel universal boom heel support which permits the boom to assume an inclined position relative to an associated support means in two mutually perpendicular planes, and wherein limited swinging movement in one of said planes is provided, this motion being in addition to the normal rotational movement of the boom heel support.

Another object of the present invention is the provision of a universal boom heel support including a ball-like bearing means supported by a support means of one-piece construction in surrounding relationship to a race means which rotatably supports the bearing means thereby eliminating the necessity of providing a two-piece support means for the bearing means which substantially eliminates the attendant fatigue problems.

Still another object of the invention is to provide a universal boom heel support which is substantially easier to fabricate and assemble than prior art arrangements.

A further object of the invention is to provide a universal boom heel support which is quite simple and inexpensive in construction, and yet which is quite sturdy and reliable in operation.

BRIEF DESCRIPTION OF THE DRAWINGS

Other objects and many attendant advantages of the invention will become more apparent when considered in connection with the specification and accompanying drawings, wherein:

FIG. 1 is a top perspective view partly broken away of a cargo handling boom mounted on the universal boom heel support of the present invention;

FIG. 2 is an enlarged vertical section through the universal boom heel support of the present invention at the heel portion of the boom;

FIG. 3 is a sectional view taken substantially along line 3—3 of FIG. 2 looking in the direction of the arrows;

FIG. 4 is a top perspective view of the bearing means and race means assembly of the present invention; and FIG. 5 is a top perspective exploded view of the structure illustrated in FIG. 4.

Referring now to the drawings where like reference characters designate corresponding parts throughout the several views, as seen most clearly in FIGS. 1–3, the deck of a ship is indicated generally by reference numeral 10 and supports a base means indicated generally by reference numeral 12. The boom support means of the present invention is indicated by reference numeral 14 and includes a flange portion 16 disposed in overlying relationship to the base means 12 and a depending substantially cylindrical portion 18 received within bearing means 20 supported by the base means, and terminates in a downwardly extending tapered portion 22 which may be received within a suitable supporting structure and bearing means.

The upper portion 30 of the boom support means as seen in FIG. 1 flares outwardly, and as seen most clearly in FIG. 2, a laterally extending bore is provided through portion 30 and includes a hole 32 at the righthand side thereof as seen in this figure. A counterbored portion provides a substantially cylindrical recess 34, and a further counterbore provides still another recess 36 at the lefthand part of portion 30 as seen in FIG. 2.

Recess portion 34 as adapted to receive and have a press fit with the race means of the present invention, the race means and bearing means construction being illustrated most clearly in FIGS. 4 and 5.

The bearing means is indicated generally by reference numeral 40 and includes an outer surface 42 defining a portion of a spherical surface. A circumferentially extending groove 44 and four equally spaced normally extending grooves 44' are provided in the outer surface of the bearing means for receiving a suitable lubricant. A substantially cylindrical bore 48 is provided through the central part of the bearing means, and a peripherally extending groove 50 with four equally normally extending grooves 46 is provided within the bearing means about the bore 48.

The race means includes a pair of similar members 60 and 62 which when in abutting relationship with one another define the complete race means. Members 60 and 62 includes generally semi-cylindrical outer surfaces 64 and 66 respectively which are adapted to fit snugly within the recess 34 of the boom support means previously described.

The outer surfaces 64 and 66 of the two race portions are provided with peripherally extending grooves 68 and 70 adapted to be aligned with one another and serving as lubricant receiving grooves. Radial passages 72 and 74 extend inwardly from the central portions of grooves 68 and 70 to introduce lubricant to the outer surface of the bearing means.

Second groove means 76 and 78 are provided in the outer surfaces of members 60 and 62 respectively, these latter groove means being adapted to receive a split ring 84 which is employed for holding the two race portions and the bearing portions in assembled relationship so that the race and bearing assembly can be initially separately assembled and then press fitted into the operative relationship shown in FIG. 2.

Members 60 and 62 are provided with inner surfaces 80 and 82 respectively, each of which defines a portion of a spherical surface complementary to the surface 42 formed on the outer surface of the bearing means so that the bearing means is mounted for substantially universal movement within the race means.

Referring again to FIG. 3, it will be noted that portion 30 of the boom support means has a pair of oppositely disposed and aligned passages 90 and 92 having grease fittings 94 and 96 mounted at the outer ends thereof for introducing lubricant inwardly into the lubricant grooves and passages of the race means and bearing means to ensure that they will be adequately lubricated during operation of the apparatus.

Again referring to FIG. 2, the race means and bearing means assembly is disposed in operative relationship within recess 34 and is retained in such operative position by an annular race retaining member 100 seated within the recess 34 provided within portion 30 of the boom support means and held in such operative relationship by a plurality of screws 102 extending through suitable holes provided in member 100 and being threaded into tapped holes provided in portion 30.

It is apparent that this arrangement may be readily assembled since the race means and bearing means may be initially assembled into the operative position shown in FIG. 4 and held in such relationship by the snap ring 84, whereupon the race means and bearing means may be press fitted into recess 34, and race retaining member 100 mounted in the operative relationship shown in FIG. 2 to hold the components in this assembled position.

In the illustrated embodiment, the race means and bearing means are initially assembled and then the assembly is pressed into recess 34. An arrangement may also be employed wherein the race means may be first pressed into the recess 34 and the bearing means subsequently inserted within the race means and mounted in operative position therewithin. Such an arrangement would further facilitate assembly of the apparatus since the race means and bearing means would not have to be pressed into operative position as a unit.

As seen particularly in FIG. 1, the boom means is indicated generally by reference numeral 110 and comprises a tubular substantially frusto-conical portion 112 having a topping lift attachment means indicated generally by reference numeral 114 fixedly secured to the upper end thereof. This topping lift attachment means includes depending ears 116 and 118 adapted to be secured to conventional topping lift lines.

A support means indicated generally by reference numeral 120 is disposed immediately below attachment means 114 and is fixed against longitudinal movement relative to the boom but is free to rotate thereon throughout 360° of rotation in either direction. The support means includes a laterally extending flange portion 122 which supports a block or sheave assembly 124 over which is trained the cargo fall line 126 attached to a cargo hook in the usual manner.

The lower portion of the boom includes an enlarged base portion 130 from which a pair of spaced jaws 132 and 134 depends. As seen most clearly in FIG. 2, the jaws 132 and 134 have aligned holes 136 and 138 formed therethrough respectively. The jaws are disposed on opposite sides of the bearing means and inwardly directed bosses 132' and 134' formed on the jaws 132 and 134 respectively are disposed adjacent the opposite end faces 140 and 142 of the bearing means 40.

A heel pin indicated generally by reference numeral 150 includes an enlarged head portion 152 and a substantially cylindrical shank portion 154 which extends through the holes 136 and 138 in jaws 132 and 134 respectively and through the central bore 48 provided within the bearing means.

The opposite end portion of the heel pin is threaded and has a nut 155 threaded thereon for retaining the heel pin in operative position. The heel pin serves to pivotally interconnect the boom with the bearing means which in turn is journalled for universal movement within the race means which is further supported by the boom support means.

The heel pin is provided with an axially extending passage 156 which opens through the enlarged head portion 152, a grease fitting 158 being mounted at this end of the passage. Two passages 160 extend diametrically through the heel pin, these passages being mutually perpendicular and intersecting axial passage 156. This arrangement enables lubricant to be introduced axially of the heel pin and thence outwardly into groove 50 and the associated grooves 46 of the bearing means 40 to ensure that the bearing means will be adequately lubricated during operation of the apparatus.

The boom support means may be formed of a suitable substance such as mild steel which is quite strong and capable of taking the relatively large forces applied thereto. The race means may also be formed of steel, while the bearing means is preferably formed of brass or bronze and the like.

Referring now to FIG. 2 of the drawings, it is apparent that the boom is mounted for rotary movement about an axis extending vertically through the longitudinal axis of the boom support means 14. Additionally, the boom is mounted for pivotal movement about the longitudinal axis of the heel pin 150. Furthermore, the mounting of the bearing means permits the boom to move in a plane which passes substantially through the longitudinal axis of the pin means, or in other words as seen in FIG. 2, the boom, along with the pin means, and the bearing means, is adapted to tilt in the plane of the paper through an angle of approximately 3° to either side of the center line as indicated. This tilting movement is adequate to accommodate any misalignment of the boom as will normally occur during vertical movement of the boom between the king posts when passing from one hatch to the other.

It is apparent from the foregoing that there is provided according to the present invention a new and novel universal boom heel support which permits the boom to assume an inclined positon relative to an associated support means, the boom being adapted to swing about the heel pin so as to move in a plane substantially normal to the longitudinal axis of the heel pin while also having limited movement in a plane extending substantially through the longitudinal axis of the heel pin. The arrangement of the present invention eliminates the necessity of providing two separate pieces in the boom support means structure to support the bearing means, thereby eliminating fatigue problems encountered in the prior art. The invention structure is also considerably easier to fabricate and assemble than prior art arrangements. The structure is quite simple and inexpensive and yet at the same time is quite sturdy and reliable in operation.

As this invention may be embodied in several forms without departing from the spirit or essential characteristics thereof, the present embodiment is therefore illustrative and not restrictive, and since the scope of the invention is defined by the appended claim, all changes that fall within the metes and bounds of the claim or that form their functional as well as conjointly cooperative equivalents are therefore intended to be embraced by this claim.

I claim:
1. A universal boom heel support comprising base means, boom support means extending upwardly therethrough and journalled therein, race means removably supported by said boom support means and having a cylindrical outer surface, said race means including an inner surface defining a portion of a spherical surface, bearing means including an outer surface defining a portion of a spherical surface and being in contact with the spherical surface of said race means whereby said bearing means is mounted for substantially universal movement with respect to said race means, boom means including a heel portion having spaced depending portions, and elongated connecting means connecting said spaced depending portions with said bearing means to move as a unit relative to said race means and said boom support means to mount the boom means for pivotal movement about an axis extending through said connecting means and also for limited movement in a plane extending through said axis, said boom support means comprising a one-piece construction surrounding said race means in a plane lying substantially perpendicular to the axis of said connecting means to provide maximum strength and rigidity, said boom support means having a hole formed therethrough, means on the boom support means at one end of the hole defining a shoulder for engaging said race means and for limiting movement thereof in one direction, separate race retaining means detachably supported by said boom support means at the opposite end of said hole, said race means being received through said opposite end of the hole and retained in operative position by said race retaining means, said hole having a configuration substantially complementary to that of the outer surface of said race means, the boom support means including portion supported for rotation about the longitudinal axis of the boom support means so that said boom means is mounted for substantially universal movement about the heel portion thereof, said boom support means having a further counterbore at said opposite end of the hole through the boom support means, said race retaining means comprising an annular member disposed within said further counterbore, said connecting means comprises a heel pin, said bearing means having a bore formed therethrough, each of said depending portions having a hole formed therethrough aligned with said bore, said heel pin extending through said bore and said aligned holes, and means for retaining said heel pin in operative position, said race means comprising a pair of members each having a groove therein and means in said groove for retaining said pair of members in operative relationship relative to one another, said heel pin having a lubricant passage therein extending to a surface thereof and said bearing member having lubricant grooves on its inner periphery intersecting said passage in said heel pin; said bearing member also having a lubricant groove on its spherical surface communicating with the lubricant grooves on its inner periphery through a lubricant passage, and said race means and support member also having intersecting lubricant passages so as to provide means for introducing lubricant by way of said heel pin or support member.

References Cited
UNITED STATES PATENTS

| | | | |
|---|---|---|---|
| 1,633,797 | 6/1927 | Taaffe | 308—236 X |
| 1,729,445 | 9/1929 | Knape | 287—90 |
| 1,856,246 | 5/1932 | Frederick | 287—87 |
| 2,304,595 | 12/1942 | Prentice | 308—72 X |
| 2,312,648 | 3/1943 | Jones | 308—72 X |
| 2,681,259 | 6/1954 | White | 308—72 |
| 2,852,290 | 9/1958 | Orstett | 287—91 X |
| 3,163,474 | 12/1964 | Wilson | 308—72 X |
| 3,174,811 | 3/1965 | Schmidt et al. | 308—72 |
| 3,176,805 | 4/1965 | Gandy | 287—87 X |
| 3,179,477 | 4/1965 | Carter | 308—72 |

EDWARD C. ALLEN, *Primary Examiner.*

A. V. KUNDRAT, *Assistant Examiner.*